E. B. TEEPLE.
RESILIENT WHEEL.
APPLICATION FILED SEPT. 13, 1915.
1,242,269.
Patented Oct. 9, 1917.
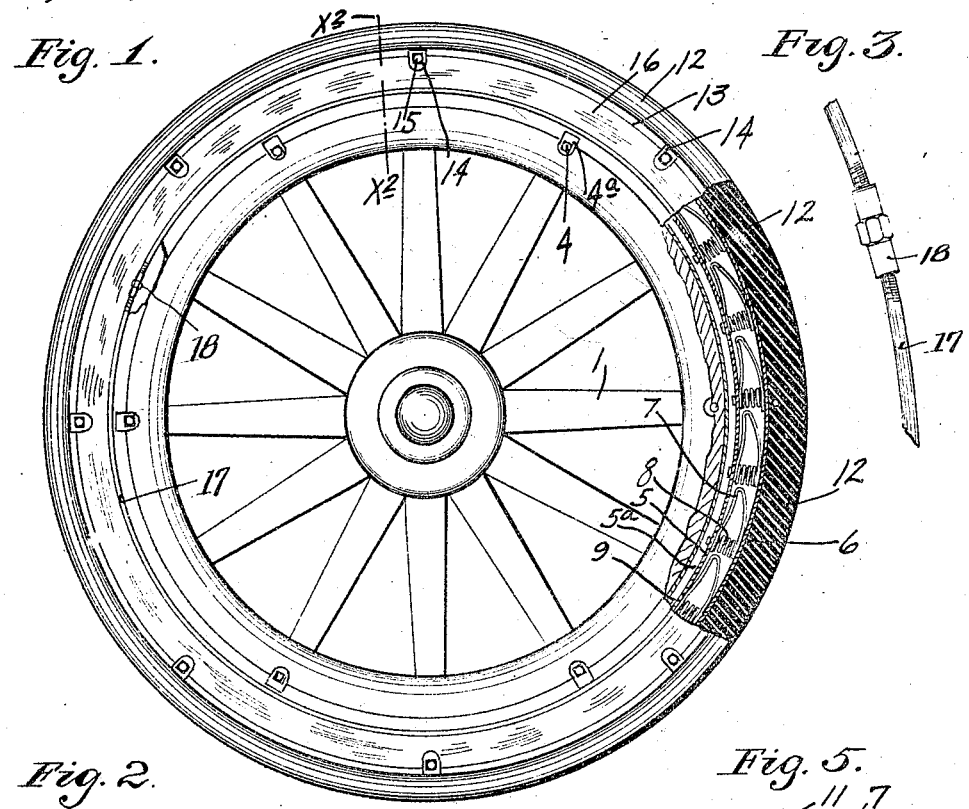
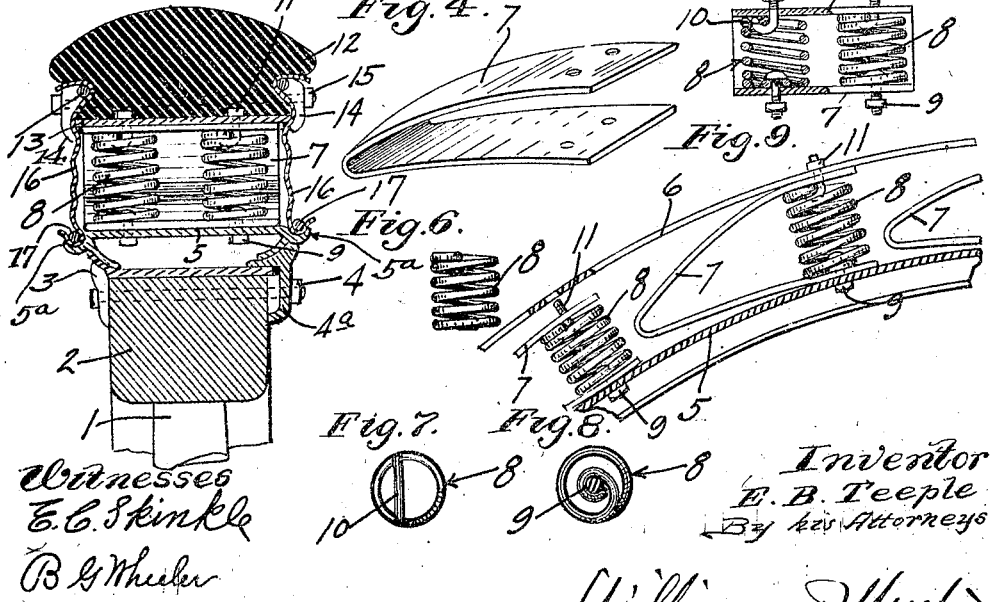
Inventor
E. B. Teeple
By his Attorneys
Williamson Merchant
Witnesses
E. C. Skinkle
B. G. Wheeler

UNITED STATES PATENT OFFICE.

EDGAR B. TEEPLE, OF MINNEAPOLIS, MINNESOTA.

RESILIENT WHEEL.

1,242,269.  Specification of Letters Patent.  Patented Oct. 9, 1917.

Application filed September 13, 1915. Serial No. 50,298.

*To all whom it may concern:*

Be it known that I, EDGAR B. TEEPLE, a citizen of the United States, residing at Minneapolis, in the county of Hennepin and State of Minnesota, have invented certain new and useful Improvements in Resilient Wheels; and I do hereby declare the following to be a full, clear, and exact description of the invention, such as will enable others skilled in the art to which it appertains to make and use the same.

My invention has for its object to provide an extremely simple and highly efficient non-pneumatic tire which will have all of the good qualities of a pneumatic tire but which will be nonpuncturable, and which may be maintained in service at less cost than a pneumatic tire. To such ends, generally stated, the invention consists of the novel devices and combinations of devices hereinafter described and defined in the claims.

In the accompanying drawings which illustrate the invention, like characters indicate like parts throughout the several views.

Referring to the drawings:

Figure 1 is a view in side elevation with some parts broken away and some parts sectioned, showing a wheel embodying my invention;

Fig. 2 is an enlarged transverse section taken on the line $x^2$ $x^2$ of Fig. 1;

Fig. 3 is a detail showing a portion of one of the clamping hoops employed in the wheel rim;

Fig. 4 is a perspective view of one of the leaf springs;

Fig. 5 is a view partly in end elevation and partly in vertical section showing one of the leaf springs with interposed coiled auxiliary springs;

Fig. 6 is a side elevation of one of the coiled auxiliary springs;

Fig. 7 is a plan view of one of the said auxiliary springs;

Fig. 8 is a bottom plan view of one of the auxiliary springs; and

Fig. 9 is a fragmentary view partly in side elevation and partly in section showing portions of the demountable rim, resilient tire band and interposed springs.

The numeral 1 indicates a wooden wheel of the well known so-called artillery type, such as generally employed on automobiles. The numerals 2 and 3 indicate, respectively, the felly and circumferentially spaced wedge lugs of a demountable wheel rim of ordinary construction. The said wedge lugs 3 are secured to the felly 2 of the wheel 1, in the usual way, by nut-equipped bolts 4 and coöperating clamping heads 4ª.

The demountable rim 5 has inturned flanges adapting it to be detachably held by the clamping heads 4ª and the wedge lugs 3, and it is provided with annular flanges 5ª, the purpose of which will presently appear.

The numeral 6 indicates an endless flat steel tire band which surrounds the rim 5, but is of considerably greater diameter, so that it is adapted to be spaced therefrom, approximately concentric therewith, by interposed springs. The said tire band 6 is preferably of spring tempered steel, but in any event, it has such rigidity that it is not capable of being given any short bends or kinks, but is, nevertheless, capable of being sprung out of its true cylindrical form. The said interposed springs, from the broader point of view, may take different forms, but as a highly important novel feature, they are made up of a form which may be approximately described as U-shaped.

Coiled auxiliary springs 8, preferably arranged in pairs, are interposed between the ends of main springs 7. At their inner ends, these coiled springs 8 are formed with eyes 9 through which, and perforations in the inner prongs of the main springs 7, and alined perforations in the demountable rim 5, short nut-equipped bolts 9 are passed. At their outer ends, the said auxiliary springs 8 have their ends turned crosswise to afford anchor bars 10 with which the hooked ends of the nut-equipped draw bolts 11 are adapted to be applied. These draw bolts 11 are passed outward through perforations in the tire band 6. The initial tension of the springs 7 and 8 is such that they will normally have less spread than the distance between the demountable rim 5 and surrounding tire band 6, note the lower or left hand springs in Fig. 9 which are shown as released and under normal tension. In connecting the springs to the tire band 6, the hooked ends of the draw bolts 11 are first applied to the cross bars 10 of the auxiliary springs 8 and are passed through perforations in the ends of the outer prongs of the main spring 7, and then are forced outward through perforations in the tire band 6. This further fact should be noted, to-wit, that the form of the springs 7 is such that when they are opened or spread into initial engagement with the rim 5 and tire band 6, they will engage the same, first, only at the outer ends of their prongs, and then when the bolts 9 and 11 are tightened, they will be drawn into flat engagement with the said rim 5 and band 6, and in doing this, their prongs will be given outward bow or spring, thus setting the said springs 7 under a sort of a complex stress, the one force being the separation of the prongs, and the other the outward springing force. In this way, the efficiency of the said springs 7 is greatly increased. Also, when the auxiliary springs 8 are connected to the said rim 5 and band 6, they will be put under some tensile stress, so that they reinforce the main spring 7, and coöperate therewith to put the resilient tire band 6 under strain to draw inward at all points toward the rim 5. Normally, of course, the said resilient tire band will be held concentric to the wheel rim.

A solid rubber tire 12 is placed around the tire band 6. This rubber tire 12, in its sides, is formed with annular channels adapted to receive endless steel clamping hoops 13, which, in turn, are held in place by clips 14 and nut-equipped bolts 15, which bolts are extended through the tire 12 and clips 14 at points radially inward of said hoops 13.

To incase the springs and protect the same from dirt, I employ annular diaphragms 16 of flexible material, such as heavy canvas. The outer edges of these diaphragms 16 are directly interposed between the channeled edges of the tire 12, which engage the inner surfaces thereof, and the clamping hoops 13 and clips 14, which engage the outer surfaces thereof. The inner edges of the said diaphragms 16 are tightly seated in the channeled flanges 5ª of the demountable rim 5, by means of clamping hoops 17 which are provided with adjusting means, preferably in the form of turn buckles 18 applied to the threaded ends thereof. At points where the turn buckles 18 are located, the flanges 5ª are preferably cut away, as shown in Fig. 1, to afford access to the said turn buckles with a wrench.

Obviously, the tire of this wheel rim cannot be punctured. The arrangement of the springs gives great resilience thereto, and at the same time, the wheel has great load carrying capacity. This is largely because the weight of the load is not carried on any one, two, three or other small number of springs, but will be distributed throughout all, or nearly all, of the springs. The distribution of the load and of the force of shocks produced by irregularities in the road, is effected by the resilient, yet comparatively stiff tire band 6. Under the weight of the load, or force of a shock, the springs at the bottom of the wheel or at the road-engaging point, will be given greatest compression, and this will cause the resilient tire band 6 to be forced from true cylindrical form into a sort of elliptical form, with its major axis extending approximately in a horizontal direction diametrically through the axis of the wheel. Obviously, the normal tension of the springs 7 and 8 tends to keep the tire band 6 in a true cylindrical form, and any change in the contour of the said tire band must take place against the opposing spring action of all, or nearly all, of said springs.

Under ordinary stresses, the auxiliary springs 8 co-act with the main springs 7 with a force tending to draw the tire band inward. However, when the tire band is given an extreme inward movement by excessive shocks so that the springs are forced radially inward beyond the neutral or normal position of the said springs indicated at the left in Fig. 9, the said springs, and particularly the coiled auxiliary springs 8, then act as buffers or compression springs to resist further inward movement; and furthermore, if the blow is sufficient, the said auxiliary springs may be compressed solid and positively resist further inward movement or compression of the main spring, thereby preventing breaking of the said main springs. The wide main springs 7 are very securely anchored, both to the rim 5 and tire band 6, and hence, are very strong in their ability to withstand lateral thrust, such as produced on the tires in traveling curves at high speed. Also, the above described arrangement of the springs is well adapted to take the torque which is produced in wheels used as traction wheels.

It will be noted that the demountable rim, the tire, the tire band, the interposed springs and the flexible spring inclosing diaphragms, constitute a self-contained structure adapted to be removed, as an entirety, from the wheel.

What I claim is:

1. The combination with a wheel rim, of a spring steel tire band spaced from and surrounding said rim, flat leaf springs interposed between said rim and tire band and secured to both thereof, so as to thereby hold the same against lateral movements, one in respect to the other, the said springs exerting strain tending to draw said tire band inward toward said wheel rim, and coiled springs also interposed between said wheel rim and tire band, the said coiled springs being under tension and anchored to said rim and band.

2. The combination with a wheel rim and a spring steel tire band surrounding and spaced therefrom, of approximately U- shaped flat springs interposed between said rim and tire band, the prongs of said springs normally having an outward flare with a spread of less than the normal distance between said rim and band, and means drawing the prongs of said springs tightly against said rim and band and securing the same thereto, under spring tension that bends the same into parallel arrangement, at the points of engagement with said rim and band, whereby the prongs of said springs are not only spread, but in themselves are given abnormal bend.

In testimony whereof I affix my signature in presence of two witnesses.

EDGAR B. TEEPLE.

Witnesses:
 HARRY D. KILGORE,
 F. D. MERCHANT.